Nov. 15, 1966 D. B. STEEN 3,285,020

AUTOMATIC POWER SUPPLY FOR THERMOELECTRIC COOLER

Filed May 28, 1965 3 Sheets-Sheet 1

INVENTOR.
DONALD B. STEEN
BY [signature]
[signature]
ATTYS.

AUTOMATIC POWER SUPPLY FOR THERMOELECTRIC COOLER

Filed May 28, 1965 3 Sheets-Sheet 2

INVENTOR.
DONALD B. STEEN
BY
ATTYS.

AUTOMATIC POWER SUPPLY FOR THERMOELECTRIC COOLER

Filed May 28, 1965 3 Sheets-Sheet 3

INVENTOR.
DONALD B. STEEN
BY [signature] [signature]
ATTYS.

United States Patent Office 3,285,020

Patented Nov. 15, 1966

3,285,020

AUTOMATIC POWER SUPPLY FOR THERMOELECTRIC COOLER

Donald B. Steen, Baltimore, Md., assignor to the United States of America as represented by the Secretary of the Navy Filed May 28, 1965, Ser. No. 459,958
12 Claims. (Cl. 62—3)

The invention described herein may be manufactured and used by or for the Government of the United States of America for governmental purposes without the payment of any royalties thereon or therefor.

The present invention relates to a thermoelectric cooler and more particularly to a temperature controlled power supply to supply energy to a bank of thermoelectric cooling elements.

The desirability of cooling a given volume of space containing electronic equipment has been established. Very briefly, the ability to control the environment of electronic equipment is an important factor in increasing its reliability and durability. Thermoelectric cooling devices have been used in the prior art for cooling electronic equipment. Generally, the prior art thermoelectric device where either on, off, or utilized as heating elements by reversing the direction of the current flow through the thermoelectric cooling device.

An object of the present invention is to provide a thermoelectric cooler having a controlled variable cooling capacity.

A further object of the invention is to provide a power supply which is capable of producing a controlled variable amount of output power and would not have transient surges during turn on.

Another object of the invention is to provide a power supply which is capable of automatically indicating the operability of the moving components.

Still another object of the invention is to provide a power supply for a variable cooling system having up to two and a quarter tons of cooling capacity and occupying a small volume of space.

The present invention provides a power supply for supplying a controlled amount of three phase alternating current power to a three phase full wave power rectifying network. The power output of the power supply is dependent upon the temperature of the space which is being cooled. The rectified power is supplied to a bank of thermoelectric cooling elements.

FIGS. 1A and 1B taken together is a circuit diagram of a power supply constructed in accordance with the invention.

Obviously many modifications and variations of the present invention are possible in the light of the above teachings. It is therefore to be understood that within the scope of the appended claims the invention may be practiced otherwise than as specifically described.

Figure 1A:
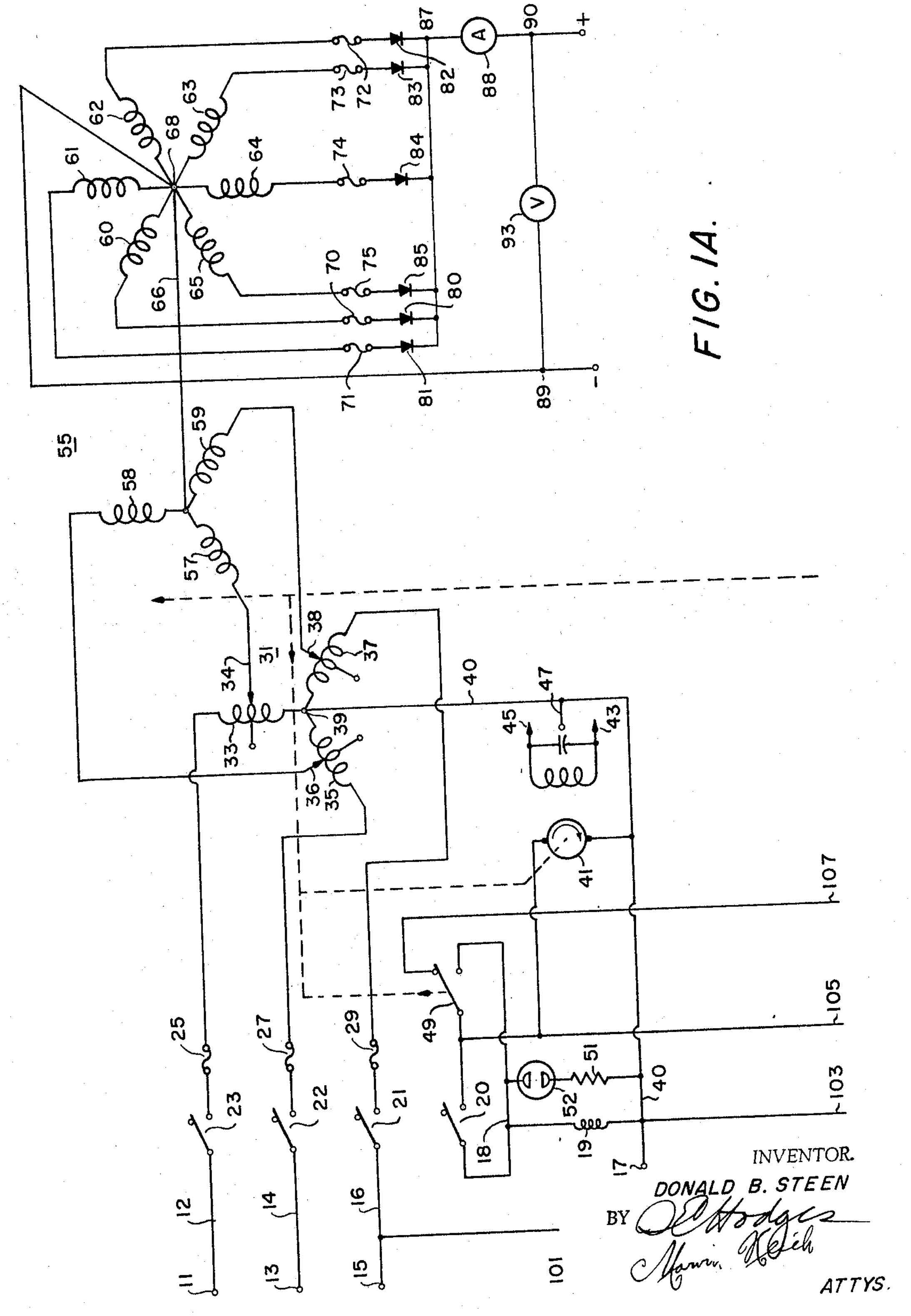
Figure 1B:
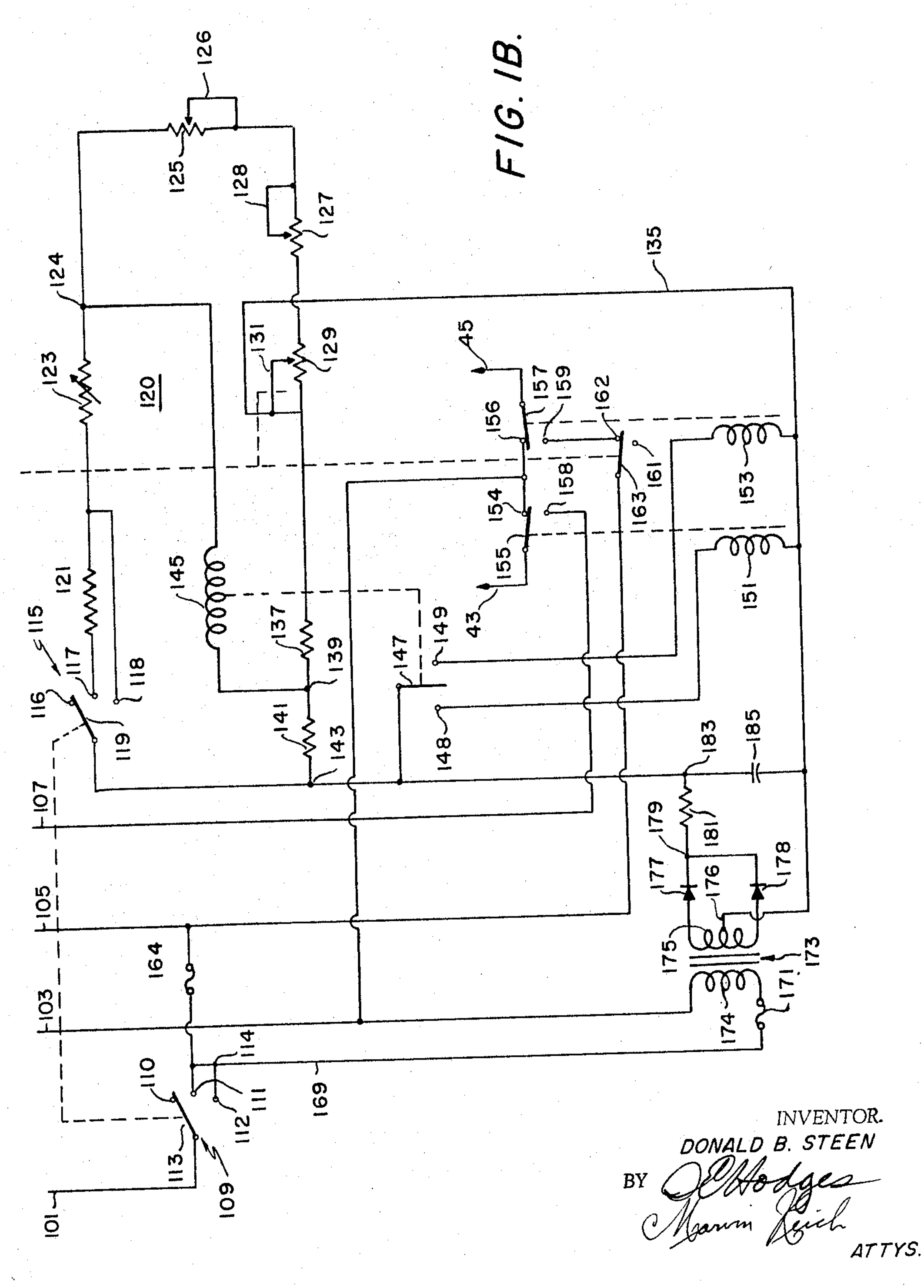

Referring to FIGS. 1A and 1B simultaneously, terminals 11, 13, 15 and 17 are provided for receiving a 60-cycle three phase alternating current. The terminal 11 is connected by a conductor 12 to one end of a switch 23, the terminal 13 is connected to one end of a switch 22 by a conductor 14 and the terminal 15 is connected to one end of a switch 21 by a conductor 16. The switches 20, 21, 22 and 23 are operated by relay 19 in a fashion to become evident hereafter. The winding of relay 19 has one of its ends connected to a conductive line

40 which is the common ground line and its other end connected to a conductor 18. The conductive ground line 40 is connected to the input terminal 17. One end of the conductor 18 is connected to one end of the switch 20. A fuse 25 is connected between one end of the switch 23 and one of the input terminals of the winding 33 of the variable transformer 31. Any suitable variable transformer may be used. A satisfactory variable transformer for use in the embodiment described is a Model VT8 variable transformer described in the "VT8 Variable Transformer," D3936, copyright 1960, by Ohmite Manufacturing Co., 3601 Howard St., Skokie, Illinois.

The output of switch 22 is connected through a fuse 27 to the primary winding 35 of the variable transformer 31 and a fuse 29 is connected between the output of the switch 21 and the input winding 37 of the variable transformer 31. The primary winding 33 of the variable transformer 31 has a movable tap 34, similarly, the primary windings 35 of the variable transformer 31 has a movable tap 36 and the primary winding 37 of the variable transformer 31 has a movable tap 38. The other end of the primary windings 33, 35 and 37 of the variable transformer 31 are connected to the common ground terminal 39 which in turn is connected to the common ground line 40. A drive motor 41 is provided to move the center taps 34, 36 and 38 in response to a control signal which will be hereafter described in greater detail. Any suitable drive motor may be used. A satisfactory drive motor for use in the embodiment discribed is the VT8 modular drive motor 7003 described in "Ohmite Motor Drive Modules D7589," copyright 1962, by Ohmite Manufacturing Co., 3601 Howard St., Skokie, Illinois. The microswitch 49 is connected to the variable transformer 31 and is closed when the contacts 34, 36 and 38 is in the zero position. This zero position is defined when the output voltage of the variable transformer is zero which occurs when the center taps 34, 36 and 38 are as near to point 39 as they can get. A resistor 51 is connected in series with a neon indicating tube 52 between the common conductive line 40 with a neon indicating tube 52 between the common conductive line 40 and the conductor 18. The neon tube 52 indicates that the circuit is in an off, an operative or standby condition. The center tap 34 on the winding 33 of the variable transformer 31 is connected to the primary winding 57 of transformer 55, the center tap 36 on primary winding 35 of variable transformer 31 is connected to the primary winding 58 of transformer 55 and the center tap 38 of the primary winding 37 of the variable transformer 31 is connected to the primary winding 59 of transformer 55. The transformer 55 has secondary windings 60, 61, 62, 63, 64, and 65. The output of the secondary winding 60 is connected through a fuse 70 to the anode of diode 80. Similarly the output of the secondary winding 61 is connected through fuse 71 to the anode of diode 81, secondary winding 62 is coupled through fuse 72 to the anode of diode 82, secondary winding 63 is coupled through fuse 73 to the anode of diode 83, secondary winding 64 is coupled through the fuse 74 to the anode of diode 84 and the secondary winding 65 is coupled through the fuse 75 to the anode of diode 85. The cathodes of diodes 80 through 86 are connected to the junction point 87. An ammeter 88 is connected between the junction point 87 and the junction point 90. The center or the common junction point 68 of all of the secondary windings 60 through 65 are connected to the output terminal 89. A voltmeter 93 is connected between the common junction point 90 and the output terminal 89. The common junction point 90 forms the other output terminal of the power supply. The thermoelectric elements which do the cooling are connected between terminal 89 and junction point 90.

An on-off standby switch 109 has its movable arm 113 connected by a lead 101 to a single phase of A.C. power by connecting it to the conductor 16 which in turn is connected to the terminal 15. The switch 109 can be switched to a contact position 110 which is the off position to a contact position 111 which is the standby position and to a contact position 112 which is the on position. The contact position 111 and 112 is connected to a common junction point 114. A second switch 115 is ganged in parallel with the switch 109 and has a movable arm 119 which can be rotated to contact 116 which is the off position, to contact 117 which is the standby position and to contact 118 which is the on position. The operation of the circuits in relationship to switch positions will be hereafter described during the operation of the system.

A bridge network 120 has a first resistor 121 one end of which is connected to the terminal 117. The other end of resistor 121 is connected to one end of the thermistor 123. The other end of thermistor 123 is connected to a common junction point 124. The terminal 118 is connected between the junction of resistor 121 and the thermistor 123. The thermistor is placed in the stream of air coming from the cooled space. A variable resistance 125 has its center tap 126 for adjusting its impedance. One end of the variable resistance 125 is connected to the junction point 124 and its other end connected to the variable resistance 127. The variable arm 128 adjusts the value of a variable resistor 127. A variable resistor 129 has one of its ends connected to the other end of the variable resistor 127 and its other end connected to one end of a resistor 137. The variable arm 131 adjusts the value of the variable resistance 129. The other end of resistor 137 is connected to the junction point 139. A resistor 141 is connected between the common junction point 139 and the junction point 139 and the junction point 143. The junction point 143 is connected up to the moving arm 119 of the switch 115.

A differential relay coil 145 is connected between the junction points 139 and 124. The differential relay 145 switches the rotating switch arm 147 between contacts 148 and 149. The contact 148 is connected to a first relay coil 151 which energizes the movable relay arm 155 between contact point 154 and 158. When the relay switch 147 is connected to position 149 it actuates a second relay 153 which controls the movable contact arms 157 which moves between contact 156 and 159. The movable control arm 163 which moves between contact position 161 and 162 is connected to the motor 41. The movable contacts 155 and 157 are connected to terminals 43 and 45 of the drive motor of the variable transformer 31 for controlling the direction of movement of the taps 34, 36 and 38 of the variable transformer 31 to be further explained hereafter.

A fuse 171 has one of its ends connected to the conductor 169 which is connected to the common switch point 114 and the other end of the fuse 171 is connected to the primary 174 of transformer 173. The other end of the primary winding 174 is connected by conductor 103 to the common conductive line 40. One of the output terminals of the secondary winding 175 is connected to the anode of diode 178. The cathode of diode 178 is connected to a junction point 179. The other end of the secondary winding 175 is connected to the anode of diode 177. The cathode of diode 177 is connected to the junction point 179. The secondary winding 175 is provided with a center tap 176 which is connected to the common conductive line 135. A resistance 181 is connected between the junction point 179 and a junction point 183. A ripple eliminating condenser 185 is connected between the junction point 183 and the common conductive line 135. The junction point 183 is connected to the junction point 143.

The operation of FIGS. 1A and 1B is as follows: The switch 109 is rotated from the contact 110 which is the off position to the contact 111 which is the standby position. Rotating the switch to contact 111 supplies A.C. power to the transformer 173. This A.C. power is then rectified by the diodes 177 and 178. The rectified power is supplied through resistor 181 and stored in the capacitor 185.

Turning switch 109 from position 110 to position 111 simultaneously turns the switch 115 from position 116 to position 117. The switch 115 and 109 are ganged together. The added resistance 121 to the bridge circuit simulates a low temperature for the exhaust air wherein the thermistor resides. This condition causes the differential relay 145 to activate, switching the relay contact 147 to terminal 148 supplying D.C. current to terminal 148 from the capacitor 185 thereby energizing the relay 151. Energizing the relay 151 throws the relay contact 155 off the terminal 154 to the terminal 158. This in turn supplies the energy to the motor 41 causing the taps 34, 36 and 38 to move towards the zero position 39. When the taps reach the zero position 39 the microswitch 49 is closed thereby disengaging or stopping the motor 41 from moving. Closing the microswitch 49 energizes relay 19 which in turn closes the switches 20, 21, 22 and 23 supplying A.C. power to the variable transformer. The neon light 52 goes on indicating that the power supply has reached a standby condition and is ready to function. The switch 20 remains closed as long as switch 109 is on either contact 111 or contact 112.

It is to be noted that the variable resistance arm 131 is ganged to the motor 41 which causes the movements of the taps 34, 36 and 38. Therefore, the value of the resistor 129 is dependent upon the position of the motor 41 to which it is ganged. The rotation of the motor shaft varies the value of the resistor 129 in a direction to compensate for changes in the thermistor 123 so as to rebalance the bridge circuit and thereby cause the current to stop flowing in the differential relay 145. Reducing the current to zero in relay 145 causes the contact arm 147 to disengage the terminal 148. When the wiper arm disengages the terminal 148, the relay 151 is deactivated thereby permitting the wiper arm 155 to disengage the terminal 158 and return to terminal 154 thereby stopping the motor in that position.

The power supply is turned to the full on position by turning the wiper 113 of the switch 109 to terminal 112 of the switch 109 and the wiper arm 119 of the switch 115 to terminal 118 of switch 115. Putting the switch on the on position eliminates the resistance 121 from the circuit of the bridge network. The temperature of the environment of the thermistor 123 determines its resistive value. The value of the thermistor 123 thereby establishes the balance or unbalance of the bridge. The current flowing in differential relay 145 is now in an opposite direction thereby causing the different contact arm 147 to contact terminal 149. When the relay switch arm 147 contacts terminal 149 the relay 153 is energized thereby throwing relay contact arm 157 from terminal 156 to terminal 159 causing the motor to move the center taps 34, 36 and 38 in the opposite direction. Movement in this direction causes a greater amount of power to be transferred through the variable transformer 31 to its output terminals which are connected to the movable center taps 34, 36 and 38. The movement of the motor varies the movement of contact wiper arm 131 in the variable resistor 129 in the direction to reestablish the balance of the bridge 120. When the bridge is rebalanced the current in the differential relay 145 ceases to flow. The contact wiper arm 147 leaves the terminal 149 inactivating the relay 153 which in turn permits the wiper arm 157 to disengage terminal 159 and to return to terminal 156. A switch 163 normally sits on contact 162 as a safety means. When the motor tends to move the contacts 34, 36 and 38 off of the windings they ride on then the switch 163 is activated by the motor thereby disconnecting the motor terminal 45 from the source of power stopping the motor. When the motor moves the center taps 34, 36 and 38 away from the center point 39 the microswitch 163 is returned to its original condition.

The power supplied by the variable transformer 31 is then fed to the primary windings 57, 58 and 59 of the three phase transformer 55. The output of the transformer 55 is taken from secondary windings 60 through 66 past through fuses 70 through 76 and rectified by diodes 80 through 86. The rectified current is then measured by the ammeter 88 and the rectified voltage is measured by the voltmeter 93 which indicates both amperage and voltage supplied to the output load at points 89 and 90.

The bridge balance is controlled by adjusting the variable resistors 127 and 125 which controls the temperature of the cooled space.

A unique feature of a system disclosed in FIGS. 1A and 1B is that if the control switches 109 and 115 are turned to the stand-by position from the on position and back again then the relay and relay contacts perform the self-testing operation which causes the relay 145, and 151 along with the motor 41 and the microswitch 49 to operate. When the 109 and 115 have been returned to their on conditions the relay 145, 153 and microswitch 19 are caused to operate along with the motor 41 thereby performing a test function and indicating whether these parts are operative. In order to test the operability of the relay 19 the circuit will have to be switched to the off position and restarted.

Figure 2:
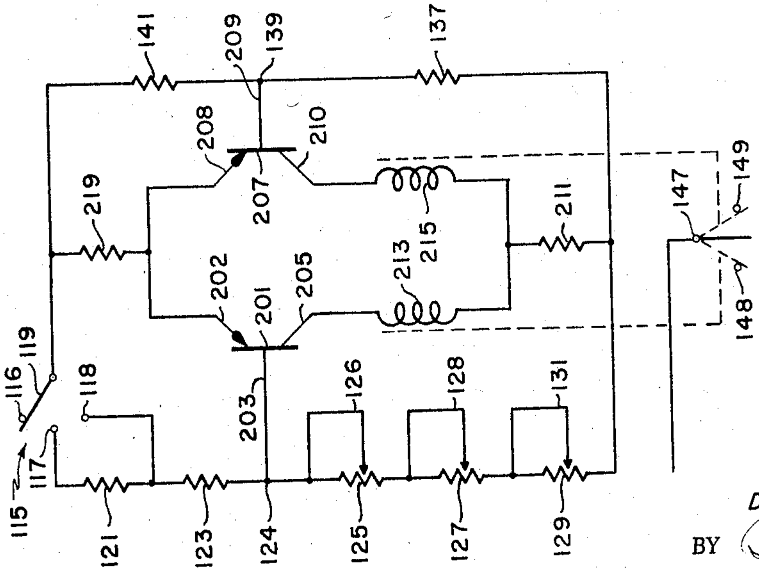
FIG. 2 is a circuit diagram of a modified control circuit which may be utilized in the power supply illustrated in FIGS. 1A and 1B.

Referring to FIG. 2, similar components as in FIGS. 1A and 1B contains the same numerical indicia as in FIGS. 1A and 1B and operate in the same fashion. The first transistor 201 has an emitter electrode 202, a base electrode 203, and a collector electrode 205. A second transistor 207 has a base electrode 209 and an emitter electrode 208, and a collector electrode 210. The emitter electrode 202 of transistor 201 is connected to the emitter electrode 208 of the transistor 207. The emitter electrode 202 of transistor 201 is connected through a resistor 219 to the switching arm 119. The base electrode 203 of transistor 201 is connected to the junction point 124 and the base electrode 209 of the transistor 207 is connected to the junction point 139. A first relay coil 213 has one of its ends connected to the collector electrode 205 of the transistor 201. The relay coil 215 has one of its ends connected to the collector electrode 210 of transistor 207. The other ends of the relay coils 213 and 215 are connected together. A resistor 211 is connected between the other end of the relay coils 213 and 215 and the junction of the variable resistor 129 and the resistor 137.

Figure 3:
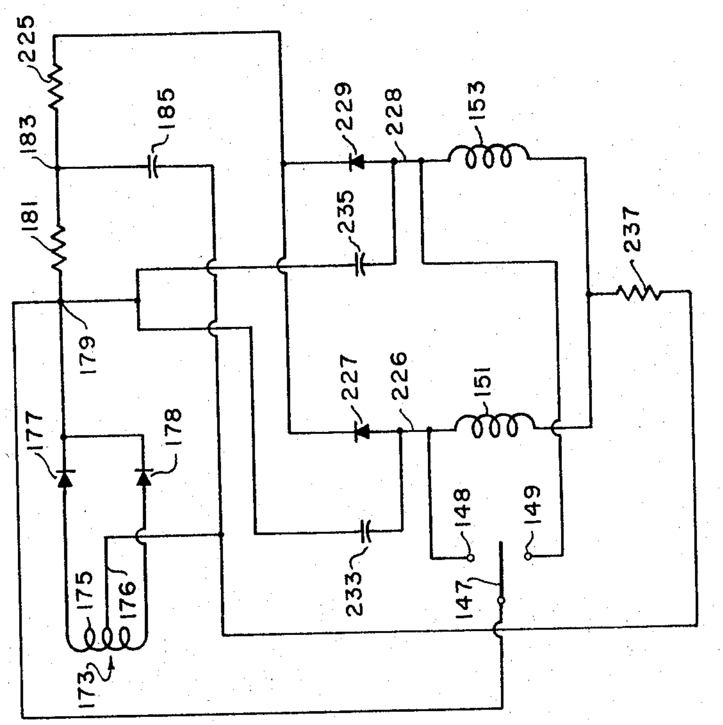
FIG. 3 illustrates a circuit modification for eliminating relay chatter which may be utilized in the power supply illustrated in FIGS. 1A and 1B.

The operation of FIG. 2 is as follows: Depending on the unbalance of the thermistor 123 caused by whether its resistance is increasing or decreasing the relay 213 or alternatively the relay 215 will actuate. Assuming that the resistance of the thermistor 123 is increased this will cause the signal on the base of a transistor 203 to become greater than the signal on the base 209 of the transistor 207 thereby causing a greater current to flow in the relay 213. This current causes the switch arm 147 to connect with the terminal 148 causing the motor 41 and associated components to operate as heretofore described. If alternatively the resistance of the thermistor 123 decreases then the current flow in the transistor 207 is greater than the current flowing in transistor 201 and therefore the current in the relay 215 will cause the switch arm 147 to contact terminal 149 causing the motor 41 to operate in the opposite direction as heretofore described. Common components of the figure in FIG. 3 as in FIG. 1 contain the same numerical indicia.

A capacitor 233 is connected between the junction point 179 and the junction point 226. A diode 227 has its anode connected to the junction point 226 and its anode connected to one end of a resistor 225. The other end of the resistor 225 is connected to the junction point 183. A capacitor 235 is connected between the junction point 179 and the junction point 228. A diode 229 has its cathode connected to the resistor 225 and its anode connected to the junction point 228. The relay coil 151 is connected through a resistor 237 to the common return line of the rectifying transformer center tap 176. The other relay coil 153 is connected to the same resistor 237. The relay coils 151 and 153 operate in a similar fashion except when the contacts are connected to the terminals 148 for the relay 151 and terminals 149 to the relay 153. A greater voltage is presented across the relay 151 or alternatively the relay 153 to assure that the contacts adhere better to their respective terminals 158 or 159. For the embodiment constructed in the laboratory the additional voltage before the addition of a circuit shown in FIG. 3 across the relay 151 would have been 18 volts however, with the modification of FIG. 3 the voltage became 22 volts thereby assuring a better contact of the terminals.

Obviously many modifications and variations of the present invention are possible in the light of the above teachings. It is therefore to be understood that within the scope of the appended claims the invention may be practiced otherwise than as specifically described.

What is claimed is:

1. A power supply for delivering a controlled amount of power to a load in response to a physical condition comprising:
  - means for sensing a physical condition;
  - variable transformer means for delivering a controlled amount of electrical power having an input and an output;
  - means responsive to said sensing means for varying said variable transformer;
  - switch means connected between a source of alternating current power and said variable transformer input means;
  - means responsive to said transformer varying means for actuating said switch means whereby the amount of power delivered to the load is dependent on said sensed physical condition;
  - and rectifying means, said rectifying means being coupled to the output of said variable transformer means.

2. A thermoelectric cooling system for proportionally cooling a given environment comprising:
  - a variable transformer having an output;
  - means responsive to the temperature of the environment to be cooled for varying said variable transformer;
  - rectifying means connected to said variable transformer having a direct current output; and
  - thermoelectric cooling elements connected to said rectifying means whereby the amount of cooling is proportional to the temperature of said environment.

3. A thermoelectric cooling system for proportionally cooling a given space comprising:
  - a variable transformer having an input and an output;
  - temperature sensing means;
  - means for varying said variable transformer in response to temperature changes sensed by said temperature sensing means;
  - switch means connected to the input of said variable transformer means;
  - means responsive to said transformer varying means for closing said switch means;
  - rectifying means coupled to the output of said variable transformer means; and
  - thermoelectric cooling means connected to said rectifying means whereby the amount of cooling is proportional to the temperature of the temperature sensing means.

4. A thermoelectric cooling system as defined in claim 3 but further characterized by having an indicating means connected to said switch closing means for indicating the closure of said switch.

5. A thermoelectric cooling system for proportionally cooling a given space comprising:

a variable three phase transformer having an input and an output;

a three phase transformer having an input and an output, said three phase transformer input connected to said variable three phase transformer output;

a rectifying means having an output and an input connected to the output of said three phase transformer;

thermoelectric cooling means connected to the ouput of said rectifying means;

a thermistor having a pair of terminals;

a first resistor having two ends one of which is connected to one of the thermistor terminals;

a second resistor having two ends one of which is connected to said other end of said first resistor;

a variable resistance means having a pair of end terminals, one of said end terminals being connected to the other end of said second resistor and the other one of said end terminals of said variable resistance means being connected to the other one of said thermistor terminals; and means for varying said variable transformer in response to temperature changes of said thermistor coupled to said thermistor whereby changes in temperature change the amount of the power supplied to said thermoelectric cooling means.

6. A thermoelectric cooling system is defined in claim 5 but further characterized by said means for varying said variable transformer comprising a differential control means having two ends, one of said ends of said differential control means being connected to the junction of said thermistor and said first resistor and the other end of said differential control means being connected to the junction of said second resistor and said variable resistor;

a motor having its drive shaft coupled to said variable transformer for varying the amount of power supplied to a load, said motor having a first input causing rotation in a first direction and a second input causing rotation in the opposite direction; and a terminal adapted to be connected to a source of power, said differential control means connecting said terminal to said first terminal of said motor in response to a first set of conditions of said thermistor or to a second terminal of said motor in response to a second set of conditions of said thermistor.

7. A thermoelectric cooling system as defined in claim 6 but further characterized by having said differential control means comprising a differential relay.

8. A thermoelectric cooling system as defined in claim 6 but further characterized by having said differential control means comprising a differential amplifier having a pair of outputs, a first relay being connected to one of said differential amplifier outputs and a second relay being connected to the other one of said differential amplifier outputs.

9. A power supply for delivering a controlled amount of power to a load in response to a physical condition comprising:

a variable three phase transformer having an input and an output;

a three phase load having an input connected to said variable three phase transformer;

means for sensing a physical condition having a resistance which varies with the physical condition having a pair of terminals;

a first resistor having two ends one of which is connected to one of the said sensing means terminals;

a second resistor having two ends one of which is connected to said other end of said first resistor;

a variable resistance means having a pair of end terminals one of said end terminals being connected to the other end of said second resistor and the other one of said end terminals of said variable resistance means being connected to the other one of said sensing means terminals; and means for varying said variable transformer in response to changes in said physical condition coupled to said sensing means, whereby change in said physical condition changes the amount of the power supplied to said load.

10. A power supply as defined in claim 9 but further characterized by said means for varying said variable transformer comprising a differential control means having two ends, one of said ends of said differential control means being connected to the junction of said sensing means and said first resistor and the other end of said differential control means is connected to the junction of said second resistor and said variable resistor;

a motor having its drive shaft coupled to said variable transformer for controlling the amount of power supplied to a load, said motor having a first input causing rotation in a first direction and a second input causing rotation in the opposite direction;

a terminal adapted to be connected to a source of power, said differential control means connecting said terminal to said first terminal in response to a first set of conditions of said sensing means or to a second terminal in response to a second set of conditions of said sensing means.

11. A power supply as defined in claim 10 but further characterized by having said differential control means comprising a differential relay.

12. A power supply system as defined in claim 10 but further characterized by having said differential control means comprising a differential amplifier having a pair of outputs, a first relay being connected to one of said differential amplifier outputs and a second relay being connected to the other one of said differential amplifier outputs.

References Cited by the Examiner

UNITED STATES PATENTS

| | | | |
|---|---|---|---|
| 2,616,019 | 10/1952 | Guillot | 219—503 |
| 2,619,630 | 11/1952 | Stone | 323—43.5 |
| 2,701,292 | 2/1955 | Lincoln | 219—503 |
| 3,026,470 | 3/1962 | Webb | 323—43.5 |
| 3,109,975 | 11/1963 | Jacobsen | 323—43.5 |
| 3,152,451 | 10/1964 | Downs | 62—3 |
| 3,161,819 | 12/1964 | Perrins | 323—43.5 |
| 3,184,677 | 5/1965 | Jacobsen | 323—43.5 |

WILLIAM J. WYE, *Primary Examiner.*